(12) United States Patent
Kim et al.

(10) Patent No.: US 11,953,222 B2
(45) Date of Patent: Apr. 9, 2024

(54) FAN MOTOR OF AIR CONDITIONER AND OPERATING METHOD THEREOF

(71) Applicant: LG ELECTRONICS INC., Seoul (KR)

(72) Inventors: Daehyoung Kim, Seoul (KR); Donghwi Kim, Seoul (KR); Jaehwa Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 402 days.

(21) Appl. No.: 17/293,249

(22) PCT Filed: Oct. 25, 2019

(86) PCT No.: PCT/KR2019/014215
§ 371 (c)(1),
(2) Date: May 12, 2021

(87) PCT Pub. No.: WO2020/101217
PCT Pub. Date: May 22, 2020

(65) Prior Publication Data
US 2021/0404689 A1 Dec. 30, 2021

(30) Foreign Application Priority Data
Nov. 16, 2018 (KR) .................. 10-2018-0142044

(51) Int. Cl.
*F24F 11/64* (2018.01)
*F24F 11/77* (2018.01)
*F24F 110/40* (2018.01)

(52) U.S. Cl.
CPC .............. *F24F 11/64* (2018.01); *F24F 11/77* (2018.01); *F24F 2110/40* (2018.01)

(58) Field of Classification Search
CPC ........ F24F 11/64; F24F 11/77; F24F 2110/40; F24F 11/75
See application file for complete search history.

(56) References Cited

U.S. PATENT DOCUMENTS

| 2006/0099084 A1 | 5/2006 | Otaki et al. |
| 2010/0256821 A1 | 10/2010 | Jeung et al. |
| 2013/0181651 A1 | 7/2013 | Lee |

FOREIGN PATENT DOCUMENTS

| CN | 101960148 | 1/2011 | |
| CN | 103765118 | 4/2014 | |
| CN | 104344492 | 2/2015 | |
| CN | 106895467 | 6/2017 | |
| EP | 2525102 | 11/2012 | |
| EP | 2613100 | 7/2013 | |
| EP | 2799789 | * 11/2014 | ........... F04D 27/004 |

(Continued)

OTHER PUBLICATIONS

Machine English Language translation of KR10-2013-0075615, to Jun et al. (translated Sep. 2023) (Year: 2013).*

(Continued)

*Primary Examiner* — Cassey D Bauer
(74) *Attorney, Agent, or Firm* — KED & ASSOCIATES, LLP

(57) ABSTRACT

The present disclosure is to provide an air conditioner, capable of performing constant air volume control regardless of the variation in a supply voltage and a method for operating the same.

11 Claims, 4 Drawing Sheets

(56) References Cited

FOREIGN PATENT DOCUMENTS

| | | | | |
|---|---|---|---|---|
| JP | 2006-207880 | 8/2006 | | |
| KR | 10-2011-0113900 | 10/2011 | | |
| KR | 10-2013-0032780 | 4/2013 | | |
| KR | 10-2013-0084499 | 7/2013 | | |
| KR | 20130075614 | * 7/2013 | ............. | Y02B 30/70 |
| KR | 10-2018-0007202 | 1/2018 | | |

OTHER PUBLICATIONS

International Search Report dated Feb. 12, 2020 issued in Application No. PCT/KR2019/014215.
Written Opinion dated Feb. 12, 2020 issued in Application No. PCT/KR2019/014215.
Chinese Office Action dated May 18, 2022 issued in Application No. 201980075280.3.
European Search Report dated Jul. 6, 2022 issued in Application No. 19883416.0.
Korean Office Action dated Oct. 25, 2023 issued in Application No. 10-2018-0142044.

* cited by examiner

FIG. 4

| STATIC PRESSURE(Pa) | | CURRENT(mA) | | | | | |
|---|---|---|---|---|---|---|---|
| AIR VOLUME (CMH) | | 500 | 600 | 700 | 800 | 900 | 1000 |
| DUTY | 10 | 15<br>1000 | 18<br>1100 | 19<br>1380 | 20<br>1500 | 23<br>2600 | 27<br>3000 |
| | 20 | 17<br>1500 | 19<br>1750 | 20<br>1900 | 26<br>2500 | 30<br>3500 | 38<br>3458 |
| | 30 | 20<br>1700 | 21<br>1900 | 30<br>2150 | 35<br>3560 | 39<br>4650 | 45<br>4500 |
| | 40 | 23<br>1900 | 26<br>2100 | 31<br>2200 | 40<br>3900 | 48<br>5040 | 50<br>6080 |
| | 50 | 25<br>2100 | 30<br>2120 | 46<br>3010 | 50<br>4050 | 54<br>6000 | 68<br>7080 |
| | 60 | 29<br>3000 | 39<br>3200 | 50<br>3150 | 53<br>4450 | 60<br>6680 | 78<br>8000 |
| | 70 | 40<br>3580 | 44<br>4050 | 53<br>3850 | 59<br>5609 | 70<br>7250 | 82<br>8580 |
| | 80 | 44<br>3900 | 50<br>4600 | 60<br>5450 | 63<br>6800 | 76<br>8046 | 88<br>9000 |
| | 90 | 48<br>4000 | 52<br>4950 | 62<br>6000 | 70<br>8460 | 86<br>9050 | 90<br>10500 |

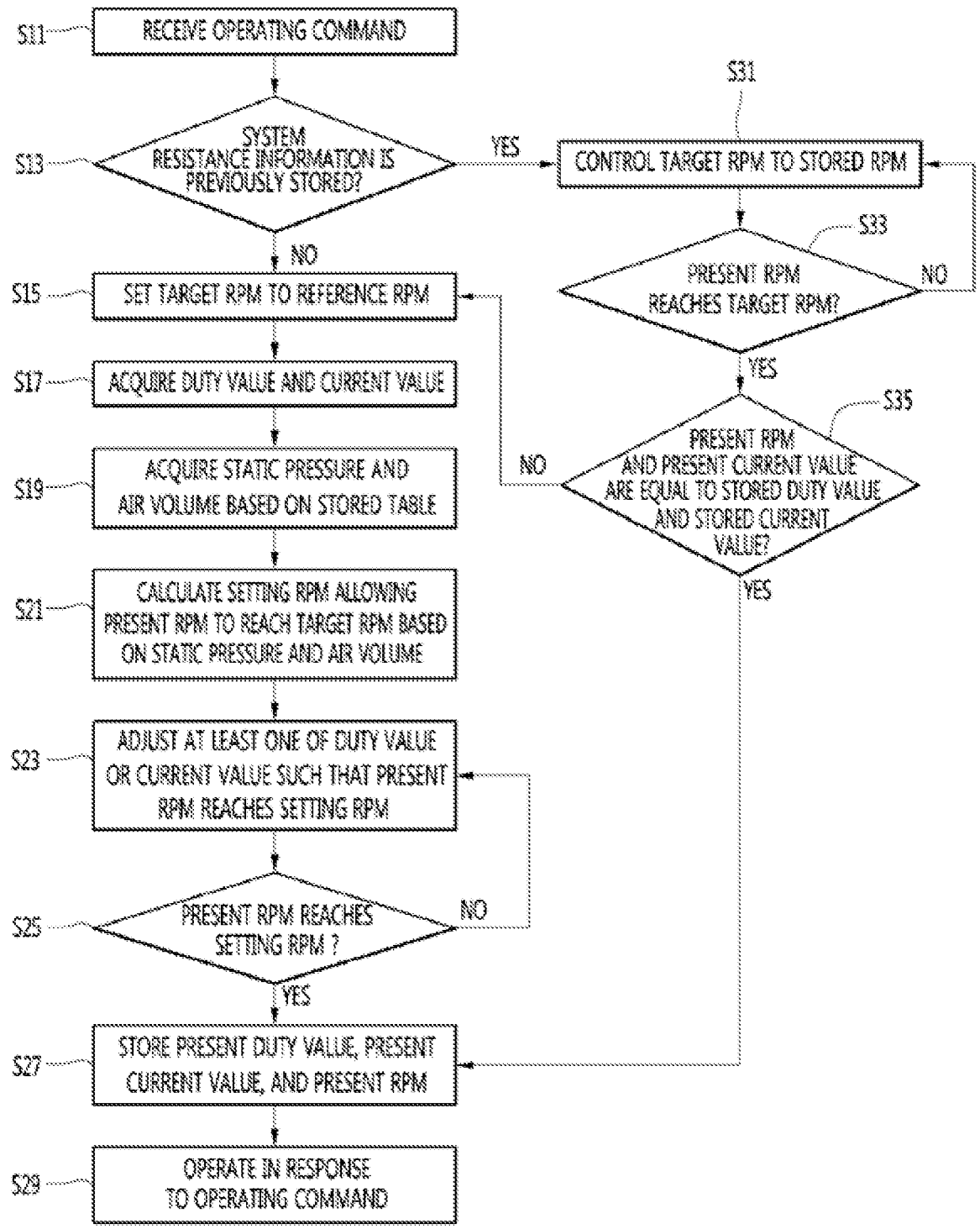

FAN MOTOR OF AIR CONDITIONER AND OPERATING METHOD THEREOF

This application is a U.S. National Stage Application under 35 U.S.C. § 371 of PCT Application No. PCT/KR2019/014215, filed Oct. 25, 2019, which claims priority to Korean Patent Application No. 10-2018-0142044, filed Nov. 16, 2018, whose entire disclosures are hereby incorporated by reference.

TECHNICAL FIELD

The present disclosure relates to an air conditioner and a method for operating the same, and more particularly to an air conditioner and a method for operating the same, capable of performing constant air volume.

BACKGROUND ART

In general, an air conditioner may include a compressor to compress a refrigerant at a high temperature and high pressure, a condenser to heat-exchange the high-temperature and high-pressure refrigerant transferred from the compressor with surrounding air and to convert the high-temperature and high-pressure refrigerant to a low-temperature and high-pressure refrigerant, an expansion valve to reduce the pressure of the refrigerant, which is converted to a liquid-phase refrigerant in the condenser and transferred, to be a low-pressure and low-pressure liquid-phase and gas-phase refrigerants, and an evaporator to maintain external air to be at a lower temperature by taking away the surrounding heat as the lower-temperature and low-pressure refrigerant passes through the evaporator and is evaporated.

The air conditioner may be classified into a separate-type air conditioner having an indoor device and an outer device separated from each other and an integral-type air conditioner in which the indoor device and the outdoor device are coupled to each other in one device, depending on the separation state of the indoor device and the outdoor device.

The separation-type air conditioner includes an indoor device installed in an interior to supply hot air or cold air into an air conditioning space and an outdoor device to perform the compression and the expansion of the refrigerant such that heat exchange is sufficiently performed in the indoor device. In this case, the separate-type air conditioner may be more classified into a picture-frame type, a wall hanging type, a stand type, a ceiling duct type, and a duct time depending on the installation position of the indoor device or the shape of the indoor device.

For example, in the case of the duct-type air conditioner, the indoor device is buried in the ceiling or the wall, and the air-conditioned air is discharged to the interior through the duct. However, in the case of the duct-type air conditioner, the shape and the length of the duct are varied depending on the installation condition of the indoor device, so the static pressure of the indoor device may be varied. In addition, the RPM of a fan motor is varied corresponding to the intensity of the air volume depending on the static pressure of the indoor device. Accordingly, even if the fan motor is driven under the same condition, air volume may be actually differently generated due to the difference in the system resistance such as the installation condition.

Accordingly, various manners have been developed to generate a desired air volume by controlling the RPM of the fan motor by measuring the static pressure when the air conditioner is operated, and an example thereof is disclosed in Korean Unexamined Patent Publication No. 10-2018-0007202 (published on Jan. 22, 2018).

However, conventionally, since current information based on static pressure is provided when a supply voltage is constant, when the supply voltage is changed depending on nations, locals, or times, the setting air volume may not be provided.

PRIOR ART

Patent Document (Patent Document 1) Korean Unexamined Patent Publication No. 10-2018-0007202 (published on Jan. 22, 2018).

DISCLOSURE OF INVENTION

Technical Problem

The present disclosure is to provide an air conditioner, capable of performing constant air volume control regardless of the variation in a supply voltage and a method for operating the same.

Solution to Problem

An air conditioner according to an embodiment of the present disclosure comprises a power supply to supply power, a driving mechanism to convert the power, which is supplied by the power supply, into a motor driving voltage depending on a duty value and to transmit the motor driving voltage to a fan motor, a current detector to detect a current value input into the fan motor, a storage to store static pressure and an air volume corresponding to the duty value and the current value, and a motor controller configured to transmit the duty value to the driving mechanism based on a target revolutions per minute (RPM), wherein the motor controller is configured to perform a system resistance calculating operation to set a target revolutions per minute (RPM) to a reference RPM, to acquire present static pressure and a present air volume from the storage based on the duty value transmitted to the driving mechanism and the current value detected by the current detector, and to calculate a setting RPM allowing a present RPM to reach the target RPM based on the present static pressure and the present air volume.

Wherein the motor controller is configured to adjust at least one of the duty value or the current value input into the fan motor such that a present RPM of the fan motor reaches the setting RPM.

Wherein the motor controller is configured to control the storage to store system resistance information including the duty value and the current value, which are changed, and the setting RPM when the present RPM reaches the setting RPM.

Wherein the motor controller is configured to set the target RPM to the stored RPM when the system resistance information is stored, and compare the duty value and the current value when the present RPM reaches the target RPM with a duty value and a current value, which are stored in the storage, to determine whether to change the system resistance information.

Wherein the motor controller is configured to control the driving mechanism based on information stored in the storage in response to an operation command when the system resistance information is not changed.

Wherein the motor controller is configured to re-perform a system resistance calculating operation to set the target RPM to the reference RPM, to acquire present static pressure and a present air volume from the storage based on the duty value transmitted to the driving mechanism and a current value detected by the current detector, and to calculate a setting RPM allowing a present RPM to reach the target RPM based on the present static pressure and the present air volume, when the system resistance information is changed.

Wherein the motor controller is configured to calculate the setting RPM based on an equation in which an air volume is proportion to an RPM of the fan motor and an equation in which static pressure is proportional to a square of the RPM of the fan motor.

A method for operating an air conditioner according to an embodiment of the present disclosure comprises performing a system resistance calculating operation, and operating in response to an operating command after the system resistance calculating operation, wherein the performing of the system resistance calculating operation includes setting a target RPM to a reference RPM, acquiring present static pressure and a present air volume depending on a duty value for controlling a fan motor and a current value input into the fan motor, based on static pressure information and air volume information corresponding to a duty value and a current value stored in the storage, and calculating a setting RPM allowing a present RPM to reach a target RPM based on the present static pressure and the present air volume.

Wherein the performing of the system resistance calculating operation further includes adjusting at least one of the duty value or the current value input into the fan motor such that a present RPM of the fan motor reaches a setting RPM, and storing system resistance information including the duty value and the current value, which are changed, and the setting RPM when the present RPM of the fan motor reaches the setting RPM.

The method further comprising performing an operation of checking change of the system resistance information when the system resistance information is previously stored, wherein the performing of the operation of checking the change of the system resistance information includes setting the target RPM to an RPM stored in the system resistance information, comparing a duty value and a current value obtained when a present RPM reaches a target RPM with a duty value and a current value included in the system resistance information, determining the system resistance information as being changed, when the duty value and the current value, which are obtained when the present RPM reaches the target RPM, are different from the duty value and the current value, which are stored in the system resistance information, according to a comparison result, and determining that the system resistance information is not changed, when the duty value and the current value, which are obtained when the present RPM reaches the target RPM, are equal to the duty value and the current value, which are stored in the system resistance information, according to the comparison result.

Advantageous Effects of Invention

According to an embodiment of the present disclosure, constant air volume control may be performed to constantly provide a setting air volume to the interior regardless of the installation condition or the use condition of the air conditioner. In particular, the setting air volume may be constantly provided to the interior regardless of the variation in power supplied to the air conditioner.

According to an embodiment of the present disclosure, the additional sensing device is not required in addition to the device to sense the current input to the fan motor for constant air volume control.

BRIEF DESCRIPTION OF DRAWINGS

FIG. 4 is a view illustrating the table in which static pressure is mapped to an air volume based on a duty value and a current value stored in an air conditioner according to an embodiment of the present disclosure.

FIG. 5 is a flowchart illustrating the operating method of the air conditioner according to an embodiment of the present disclosure.

BEST MODE FOR CARRYING OUT THE INVENTION

Hereinafter, embodiments of the present disclosure will be described in detail with reference to the accompanying drawings.

Although the following description will be made, by way of example, in that an air conditioner according to an embodiment of the present disclosure is a duct-type air conditioner, this is provided only for the illustrative purpose, and the present disclosure is not limited thereto. The air conditioner according to the embodiment of the present disclosure may include both a separate-type air conditioner, such as a duct-type air conditioner, a wall-mount type air conditioner, and a stand-type air conditioner, and an integrated-type air conditioner.

Figure 1A:
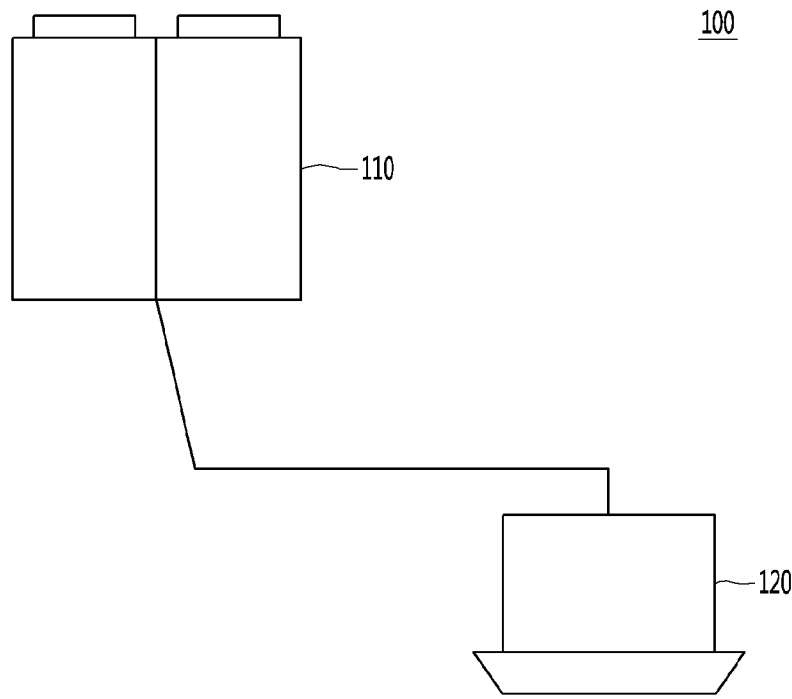
FIG. 1a is a schematic view illustrating a duct-type air conditioner according to an embodiment of the present disclosure.
Figure 1B:
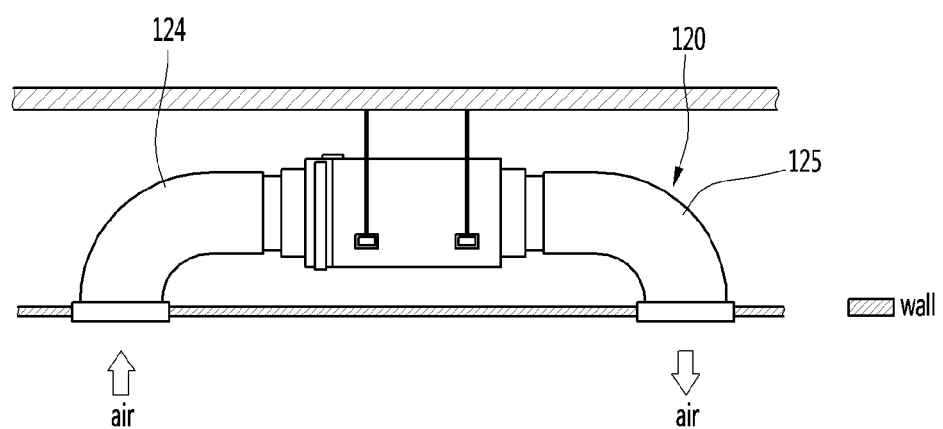
FIG. 1b is a view illustrating an indoor device of the duct-type air conditioner according to an embodiment of the present disclosure.

FIG. 1a is a schematic view illustrating a duct-type air conditioner according to an embodiment of the present disclosure, and FIG. 1b is a view illustrating an indoor device of the duct-type air conditioner according to an embodiment of the present disclosure.

A duct-type air conditioner 100 includes an outdoor device 110 and an indoor device 120, and the outdoor device 110 is linked to the indoor device 120 through a refrigerant pipe.

The refrigerant flows between the outdoor device 110 and the indoor device 120. The outdoor device 110 may include a compressor (not illustrated), an outdoor heat exchanger (not illustrated), an outdoor fan (not illustrated), and an expansion mechanism (not illustrated), and an indoor device may include an indoor heat exchanger 121 (see FIG. 2) and an indoor fan 123 (see FIG. 2).

The compressor may compress the refrigerant to discharge a high-pressure gas refrigerant, and the outdoor heat exchanger may condense the high-pressure gas refrigerant by exchanging the high-pressure gas refrigerant with the external air. The outdoor fan may accelerate heat exchange in the outdoor heat exchanger, may suction external air, and may discharge the heat-exchanged air to the outside. The expansion mechanism may expand the condensed refrigerant, and the indoor heat exchanger may heat exchange between the refrigerant and the indoor air. The indoor fan may introduce indoor air into the indoor heat exchanger, and discharge the air heat-exchanged in the indoor heat exchanger to the interior.

As illustrated in FIG. 1b, the indoor device 120 of the duct-type air conditioner 100 may be installed on a ceiling or a wall. The indoor device 120 may be mounted in the form of being buried in the celling or the wall.

The indoor device 120 may include ducts 124 and 125, and the ducts 124 and 125 may suction the indoor air or may discharge air-conditioned air to the interior.

Figure 2:
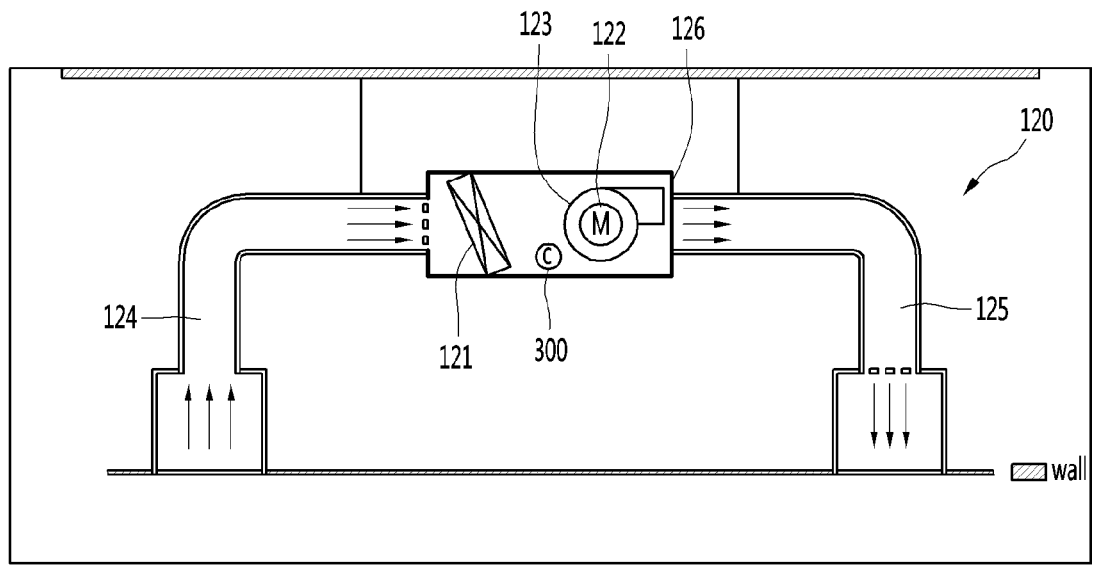
FIG. 2 is a sectional surface illustrating an inner part of the indoor device of the duct-type air conditioner according to an embodiment of the present disclosure.

FIG. 2 is a sectional surface illustrating an inner part of the indoor device of the duct-type air conditioner according to an embodiment of the present disclosure.

The indoor device 120 of the duct-type air conditioner 10 may include an indoor heat exchanger 121, a fan motor 122, an indoor fan 123, a fan motor controller 300, a suction duct 124, a discharge duct 125, and a case 126.

The case 126 may form an outer appearance of the indoor device 120. The case 126 may be directly detached to or fixed to the wall surface, or may be fixed to the wall surface through a wire. The indoor heat exchanger 121, the fan motor 122, the indoor fan 123, and the fan motor controller 300 may be installed in the space formed in the case 126.

The indoor heat exchanger 121 may heat-exchange air introduced into the indoor device 120. The indoor heat exchanger 121 may be interposed between the suction duct 124 and the discharge duct 125. The indoor heat exchanger 121 may heat-exchange air suctioned through the suction duct 124 with the refrigerant to cool or heat the air and then may discharge the air through the discharge duct 125.

The fan motor 122 may be a brushless DC motor (BLDC motor). In general, the BLDC motor is a motor including a rotor having an armature and a stator having an electric wire wound around the stator to determine the current direction of the electric wire using a sensor. The current direction is switched using a three-phase or four-phase inverter. The BLDC generates a higher torque at a lower speed and a higher speed and is able to rotate at a higher speed. In addition, the BLDC has a longer lifespan and hardly causes the noise because the coil current is applied through a semiconductor device However, the fan motor 122 is not limited to the BLDC motor, but may be realized with a Permanent Magnet Synchronous Motor (PMSM), a synchronous motor, an induction motor, a reluctance motor, a stepping motor, an ultrasonic motor, and a linear motor.

The fan motor 122 may drive the indoor fan 123. The fan motor 122 may rotate, or may transmit driving force from the rotation to the indoor fan 123.

The indoor fan 123 may introduce air into the case 126 or may discharge air output through the indoor heat exchanger 121 to the interior. The indoor fan 123 may be connected with the fan motor 122, and may rotate as the fan motor 122 rotates.

The indoor fan 123 may be disposed closer to the discharge duct 125 of the suction duct 124 and the discharge duct 125.

The suction duct 124 and the discharge duct 125 may be connected with the case 126. The suction duct 124 and the discharge duct 125 may allow the inner part of the case 126 to communicate with the interior and may guide the flow of the air.

The suction duct 124 may guide the air introduced from the interior into the case 126, and the discharge duct 125 may guide the internal air of the case 126 into the interior. According to an embodiment, a filter (not illustrated) may be disposed in the suction duct 124 to filter out foreign substances included in the air suctioned from the interior.

The suction duct 124 and the discharge duct 125 may be formed on opposite surfaces of the case 126, respectively. Preferably, the suction duct 124 and the discharge duct 125 may be formed on different surfaces of the case 126.

The fan motor controller 300 may drive the fan 123 by controlling the revolution per minute (RPM) of the fan motor 122.

The fan motor controller 300 may perform the constant air volume control. In this case, a constant air volume may refer to an air volume between the maximum reference air volume and the minimum reference air volume within the variation range of the high static pressure and the low static pressure. In addition, the constant air volume control may refer to a controlling operation for constantly supplying the setting air volume in an air-condition region regardless of the variation of the static pressure. In other words, the constant air volume control may refer to an operation of controlling the air volume supplied to the air conditioning region to be within an error range (±10%) of the setting air volume.

Figure 3:
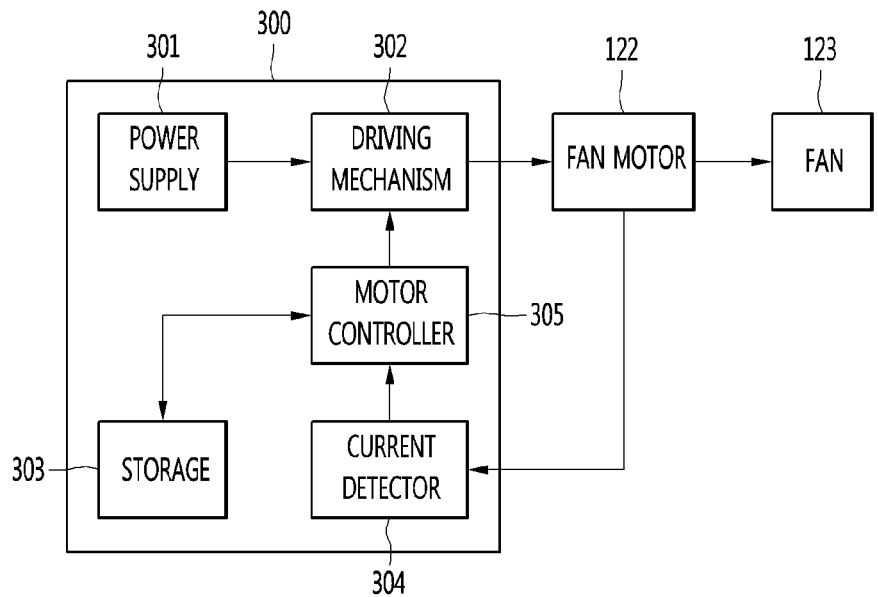
FIG. 3 is a control block diagram illustrating the indoor device of the duct-type air conditioner according to an embodiment of the present disclosure.

FIG. 3 is a control block diagram illustrating the indoor device of the duct-type air conditioner according to an embodiment of the present disclosure.

The indoor device 120 may include the indoor fan 123, the fan motor 122, and the fan motor controller 300.

The power supply 301 may receive power from the outside and may supply the power to the indoor device 120. The power supply 301 may include a power input device (not illustrated) to receive AC power from the outside, a converter (not illustrated) to convert the AC power into DC power, and a DC capacitor (not illustrated) to smooth the converted DC power.

The driving mechanism (or driving circuit) 302 may convert the supply power from the power supply 301 into a motor driving voltage to be supplied to the fan motor 122.

The driving mechanism 302 may receive a control signal including a duty value from a motor controller (or controller) 305. The driving mechanism 302 may include an inverter (not illustrated) to convert the DC power supplied from the power supply 301 into an AC voltage by controlling an On/Off state of a switching device (not illustrated) based on the duty value.

The driving mechanism 302 may supply the AC voltage, which is converted based on the duty value, to the fan motor 122. The fan motor 122 may rotate at an RPM corresponding to the AC voltage supplied from the driving mechanism 302.

A current detector 304 may detect a current value input to the fan motor 122.

A storage (or memory) 303 may store the static pressure and the air volume corresponding to the duty value and the current value. The storage 303 may store a table in which static pressure and an air volume are mapped to each other based on a plurality of duty values and a plurality of current values.

FIG. 4 is a view illustrating a table in which static pressure and an air volume are mapped to each other based on a duty value and a current value stored in an air conditioner according to an embodiment of the present disclosure.

The storage 303 may store the table as in FIG. 4 calculated by measuring the static pressure and the air volume several times in the state that duty values and current values are differently set after the manufacturing of the air conditioner is completed.

For example, the storage 303 may store a table in which the static pressure of 15 Pa is mapped to the air volume 1000 CMH when the duty value is 10% and the current value is 500 mA, and the static pressure of 18 Pa is mapped to the air volume 1100 CMH when the duty value is 10% and the current value is 600 mA.

Hereinafter, the description will be made again with reference to FIG. 3.

The motor controller 305 may control the driving mechanism 302, the storage 303, and the current detector 304.

The motor controller 305 may set a target RPM based on an air volume input by a user and may transmit a duty value based on the target RPM to the driving mechanism 302 to drive the fan motor 122 and the fan 123.

For example, when the air volume input by the user is a strong air volume, the motor controller 305 may set the target RPM to 1000 and transmit the duty value to the driving mechanism 302. Alternatively, when the air volume input by the user is a weak air volume, the motor controller 305 may set the target RPM to 500 to transmit the duty value to the driving mechanism 302.

Meanwhile, in the duct-type air conditioner, although the target RPM is set to 1000 such that the air volume becomes 5000 CMH when the air volume input by the user is a strong air volume, the air volume may be weaker than or stronger than 5000 CMH due to system resistance such as a duct length, a duct thickness, or dust piled up, even if the fan motor 122 is controlled to 1000 RPM. In other words, as the air volume becomes different from the setting air volume due to the system resistance, the constant air volume control may be difficult.

In this case, the system resistance may refer to all factors to interrupt the setting air volume from being constantly supplied due to the environment condition (for example, a duct length or a duct thickness) in which the duct-type air conditioner is installed, or the use condition (dust piled up due to long-term use, a failure cause occurring in a duct suction port or a duct discharge port, or the variation in a supply voltage).

Therefore, according to an embodiment of the present disclosure, the air conditioner senses or stores system resistance information and changes the RPM depending on the system resistance information, thereby performing the constant air volume control.

FIG. 5 is a flowchart illustrating the operating method of the air conditioner according to an embodiment of the present disclosure.

The motor controller 305 may receive an operating command (S11).

The operating command may be a control command that is transmitted to the motor controller 305 depending on the air volume, a wind speed input through an input module (not illustrated) when a user inputs the air volume or a wind speed to the indoor device 102 through the input module (not illustrated). In other words, the operating command may be a command for controlling to supply a setting air volume to the interior based on information input through the input module (not illustrated).

For example, the motor controller 305 may receive an operating command for controlling to supply the air volume of 6000 CMH to the interior.

The motor controller 305 may determine whether system resistance information is previously stored (S13).

The motor controller 305 may determine whether the system resistance information based on the received operating command is stored when the operating command is received.

For example, when the setting air volume is 6000 (CMH), the motor controller 305 may determine whether the system resistance information is previously stored. For another example, when the operating command is an operating command for controlling the air volume of 5000 CMH to be supplied to the interior, and when the setting air volume is 5000 CMH, the motor controller 305 may determine whether the system resistance information is previously stored.

When the system resistance information is not stored, the motor controller 305 may perform a system resistance calculating operation.

In this case, the system resistance calculating operation, which is an operation for changing and setting the RPM based on the installation condition or the user condition of the duct-type air conditioner 100, may be an operation to perform the following steps S15 to S27.

The motor controller 305 may set the target RPM to the reference RPM when the system resistance information is not stored (S15).

In this case, the reference RPM, which is an RPM previously measured through the experiment, may be an RPM of the fan motor, which is measured when the setting air volume is supplied based on the same model. The storage 303 may store reference static pressure, a reference duty value, and a reference current value together with a reference RPM corresponding to the setting air volume, and the reference static pressure, the reference duty value, and the reference current value are measured values in advance when the air conditioner having the same model supplies the setting air volume.

For example, the motor controller 305 may set the target RPM as the reference RPM when the setting air volume is 6000 CMH, and the reference RPM may be 1000.

The motor controller 305 sets the target RPM as the reference RPM and transmits a control signal including a duty value to the driving mechanism 302, and the driving mechanism 302 may control the fan motor 122 based on the duty value included in the control signal.

The motor controller 305 may acquire a duty value and a current value (S17).

The motor controller 305 may acquire a duty value included in the control signal transmitted to the driving mechanism 302. The motor controller 305 may acquire a current value by receiving a current, which is detected by the current detector 304, input to the fan motor 122.

The motor controller 305 may acquire static pressure and an air volume based on the stored table (S19).

The motor controller 305 may acquire the static pressure and the air volume corresponding to the duty value and the current value acquired in step S17, from the storage 303.

For example, when the duty value is 70 and the current is 800 as acquired in step S17, the motor controller 305 may acquire the static pressure of 59 and the air volume of 5609 based on the table illustrated in FIG. 4.

The motor controller 305 may calculate a setting RPM allowing a present RPM to reach the target RPM based on the static pressure and the air volume (S21).

In detail, the motor controller 305 may calculate the setting RPM based on Equation 1 indicating that the air volume is proportional to the RPM of the fan motor 122, and Equation 2 indicating that the static pressure is proportional to the square of the RPM of the fan motor 122.

$$\frac{Q_1}{Q_2} = \left(\frac{N_1}{N_2}\right) \qquad \text{Equation 1}$$

$$\frac{H_1}{H_2} = \left(\frac{N_1}{N_2}\right)^2 \qquad \text{Equation 2}$$

In this case, $Q_1$ may refer to the setting air volume, $Q_2$ may refer to the current air volume (air volume obtained in step S19), $N_1$ may refer to the reference RPM, $N_2$ may refer to the setting RPM (RPM of the fan motor 122 to be calculated in the present step), $H_1$ may refer to reference static pressure, and $H_2$ may refer to present static pressure (static pressure obtained in step S19).

The motor controller 305 may adjust at least one of a duty value or a current value such that the present RPM reaches the setting RPM (S23).

For example, the motor controller 305 may adjust at least one of a duty value and a current value such that the present RPM reaches 1100.

In particular, the motor controller 305 may increase or decrease the duty value such that the present RPM reaches the setting RPM.

The motor controller 305 may determine whether the present RPM reaches the setting RPM (S25).

The motor controller 305 may adjust at least one of a duty value or a current value again when the present RPM fails to reach the target RPM.

The motor controller 305 may store the present duty value, the present current value, and the present RPM when the present RPM reaches the setting RPM (S27).

The motor controller 305 may store, as the system resistance information, the present duty value, the present current value, and the present RPM in the storage 303, when the present RPM reaches the setting RPM.

The motor controller 305 may operate in response to an operating command after storing the present duty value, the present current value, and the present RPM (S29).

In other words, the motor controller 305 may maintain the present RPM after storing the system resistance information, and may operate in response to the operating command by controlling the driving mechanism 302.

The motor controller 305 may operate in response to the operating command by changing the target RPM after the system resistance calculating operation is performed.

Meanwhile, in step S13, the motor controller 305 may perform an operation of checking the change of the system resistance information if the system resistance information is determined as being stored.

In this case, an operation of checking the change of the system resistance information may be an operation of checking the case that the system resistance is changed, for example, the case that the dust is piled up, as the duct-type air conditioner 100 is used for a long time.

The motor controller 305 may perform the following steps S31 to S5 when performing the operation of checking the change of the system resistance information.

First, the motor controller 305 may control the target RPM to be the stored RPM, when the system resistance information is determined as being stored (S31).

In this case, the stored RPM, which is the present RPM stored in step S27, may be equal to the setting RPM calculated in step S21.

The motor controller 305 may determine whether the present RPM reaches the target RPM (S33).

The motor controller 305 may returns to step S31 when the present RPM fails to reach the target RPM.

If the present RPM reaches the target RPM, the motor controller 305 may compare the present duty value and the present current value, which are indicated when the present RPM reaches the target RPM, with the duty value and the current value, which are stored as the system resistance information, (S35).

In this case, the present duty value is a duty value according to the control signal transmitted to the driving mechanism 302 by the motor controller 305 when the present RPM reaches the target RPM. The present current value may be a current value detected by the current detector 304 when the present RPM reaches the target RPM.

If the duty value and the current value, which are obtained when the present RPM reaches the target RPM, are different from a duty value and a current value included in the system resistance information according to the comparison result, the motor controller 305 may determine the system resistance information as being changed, and may perform the system resistance calculating operation again.

Meanwhile, if the duty value and the current value, which are obtained when the present RPM reaches the target RPM, are equal to the duty value and the current value included in the system resistance information according to the comparison result, the motor controller 305 may determine that the system resistance information is not changed, and may operate in response to the operating command (S29).

In other words, the motor controller 305 may control the driving mechanism 302 based on the information stored in the storage 303 in response to the operating command when the system resistance information is not changed.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. An air conditioner comprising:
   a fan motor to drive a rotation of a fan;
   a driving circuit to convert power, which is supplied by a power supply, into a motor driving voltage depending on a duty value and to provide the motor driving voltage to the fan motor;
   a current detector to detect a current input into the fan motor;
   a memory that stores information identifying a static pressure and an air volume corresponding to the duty value and the current value; and
   a motor controller configured to identify the duty value to the driving circuit based on a target revolutions per minute (RPM) for the fan motor,
   wherein the motor controller is configured to perform a system resistance calculating operation that includes:
   acquiring the static pressure and the air volume from the memory based on the duty value identified to the driving circuit and the current detected by the current detector, and calculating a setting RPM for the fan motor based on the target RPM, the static pressure, and the air volume.

2. The air conditioner of claim 1, wherein the motor controller is configured to:
adjust at least one of the duty value or the current being input into the fan motor such that the fan motor operates at the setting RPM.

3. The air conditioner of claim 2, wherein the motor controller is configured to:
control the memory to store system resistance information identifying the duty value or the current of the fan motor operating at the setting RPM, and the setting RPM.

4. The air conditioner of claim 3, wherein the motor controller is configured to:
set the target RPM to a stored RPM when the system resistance information is stored; and
compare the duty value and the current of the fan motor when the fan motor operates at the target RPM with, respectively, a stored duty value and a stored current value, which are stored in the memory, to determine whether to change the system resistance information.

5. The motor controller of claim 4, wherein the motor controller is configured to:
control the driving circuit based on the information stored in the memory in response to an operation command when the system resistance information is not changed.

6. The air conditioner of claim 4, wherein the motor controller is configured to:
re-perform the system resistance calculating operation when the system resistance information is changed.

7. The air conditioner of claim 1, wherein the motor controller is configured to:
calculate the setting RPM based on a first equation in which air volume is proportion to an RPM of the fan motor and a second equation in which static pressure is proportional to a square of the RPM of the fan motor.

8. The air conditioner of claim 1, further comprising:
a heat exchanger to exchange heat with air introduced into the air conditioner, wherein the fan generates an air flow to the heat exchanger.

9. The air conditioner of claim 1, wherein the information stored by the memory identifies static pressures and air volumes corresponding to a plurality of combinations of duty values and current values.

10. The air conditioner of claim 9, wherein the motor controller, when performing the system resistance calculating operation, is further configured to:
set the target RPM for the fan motor to a reference RPM associated with a reference static pressure and a setting air volume in the information stored by the memory.

11. The air conditioner of claim 1, wherein the fan motor includes:
a brushless direct current motor (BLDC motor),
permanent magnet synchronous motor (PMSM),
a synchronous motor,
an induction motor,
a reluctance motor,
a stepping motor,
an ultrasonic motor, or
a linear motor.

* * * * *